C. WALES.
MECHANISM FOR CONVERTING MOTION.
APPLICATION FILED JULY 3, 1911. RENEWED NOV. 11, 1914.
1,122,176.
Patented Dec. 22, 1914.
4 SHEETS—SHEET 1.
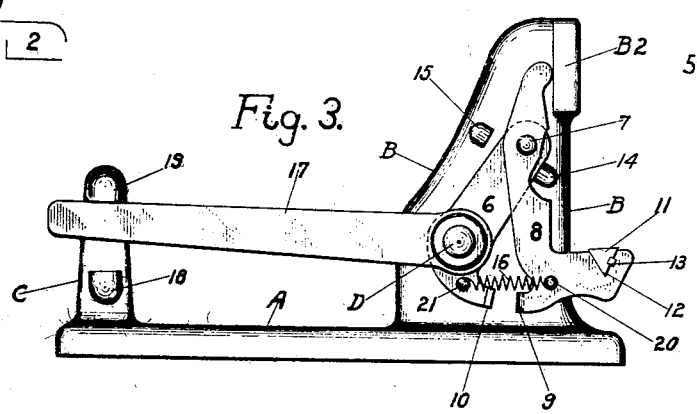
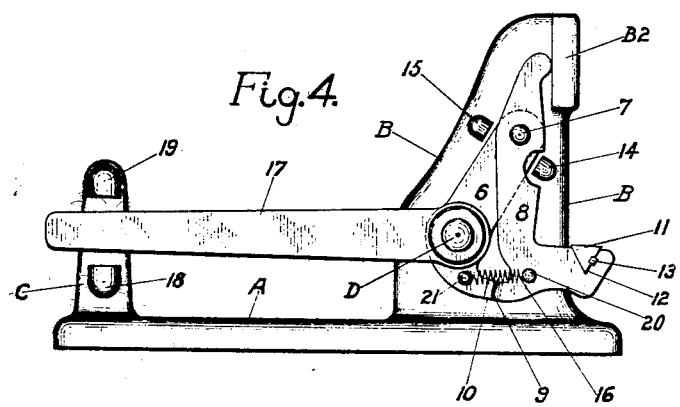
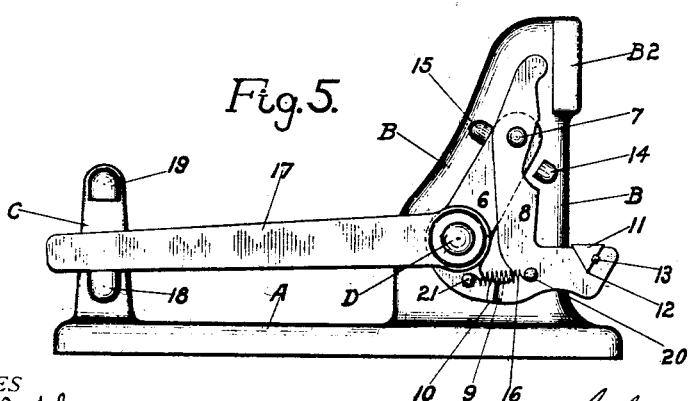

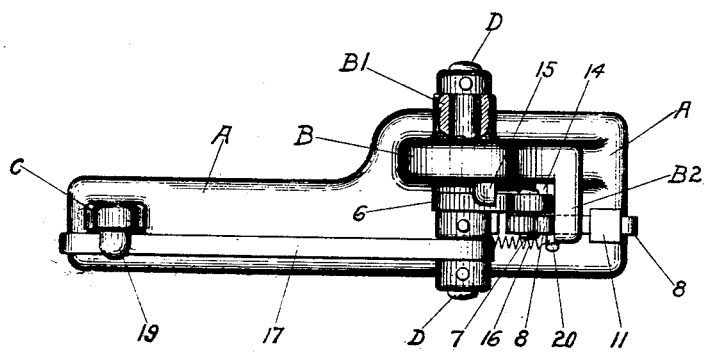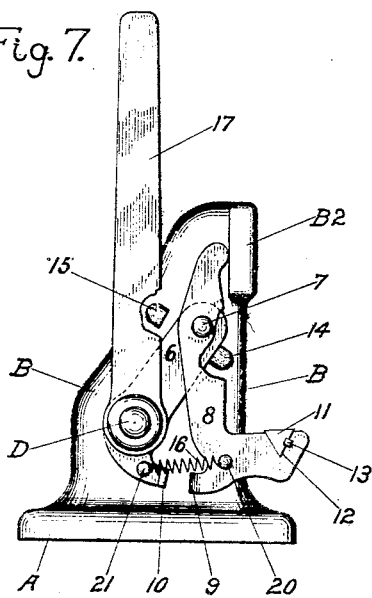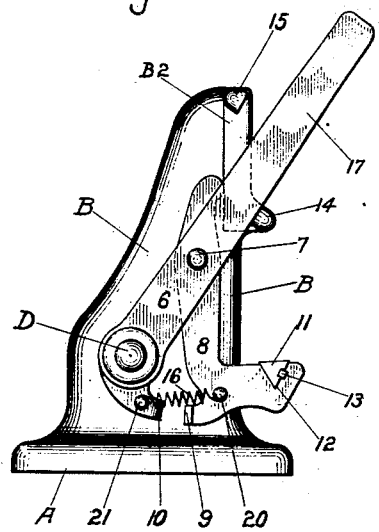

C. WALES.
MECHANISM FOR CONVERTING MOTION.
APPLICATION FILED JULY 3, 1911. RENEWED NOV. 11, 1914.

1,122,176.

Patented Dec. 22, 1914.
4 SHEETS—SHEET 3.

WITNESSES
Harry B. Thomson
Edgar N. Camp

INVENTOR
Charles Wales
By Cyrus Kehr
Attorney

UNITED STATES PATENT OFFICE.

CHARLES WALES, OF NASHVILLE, TENNESSEE, ASSIGNOR TO THE WHITE ADDING MACHINE COMPANY, OF NEW HAVEN, CONNECTICUT, A CORPORATION OF CONNECTICUT.

MECHANISM FOR CONVERTING MOTION.

1,122,176.   Specification of Letters Patent.   Patented Dec. 22, 1914.

Application filed July 3, 1911, Serial No. 636,796. Renewed November 11, 1914. Serial No. 871,829.

*To all whom it may concern:*

Be it known that I, CHARLES WALES, a citizen of the United States, residing at Nashville, in the county of Davidson and State of Tennessee, have invented a new and useful Improvement in Mechanism for Converting Motion, of which the following is a specification, reference being had to the accompanying drawing.

My improvement relates particularly to mechanism for converting simple reciprocatory or oscillatory motion into a motion along a path comprising two approximately straight lines meeting each other to form an approximately right angle, the expression "simple reciprocatory or oscillatory motion" being here used as meaning movement in a straight line or in an approximately uniform curve, without angle or off-set—a back-and-forth movement of some member in a straight line or in a curved line which is concentric to a fixed axis.

The object of my improvement is to provide a mechanism whereby a mechanical member having such reciprocatory or oscillatory movement on such a straight line, or on such a curved line, may cause a back-and-forth movement of another mechanical member in an L-shape path, a path which consists of two substantially straight path sections which meet each other at a right angle. The member thus moving through such L-shape path may be used practically for various kinds of work, as, for instance, such member may be made to move horizontally beneath another member, and then, by an upward movement, lift such other member, and then return through the same path to its first position.

For convenience in description, the member from which motion is transmitted is hereinafter termed the "motion transmitting member", while the member to which motion is transmitted is termed the "motion receiving member".

Figure 9:
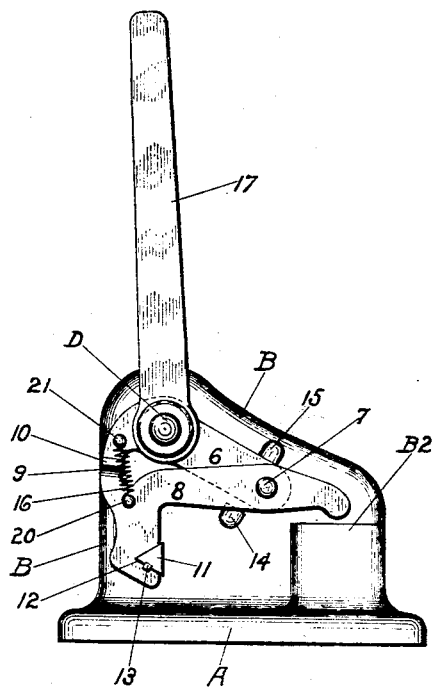
Figure 10:
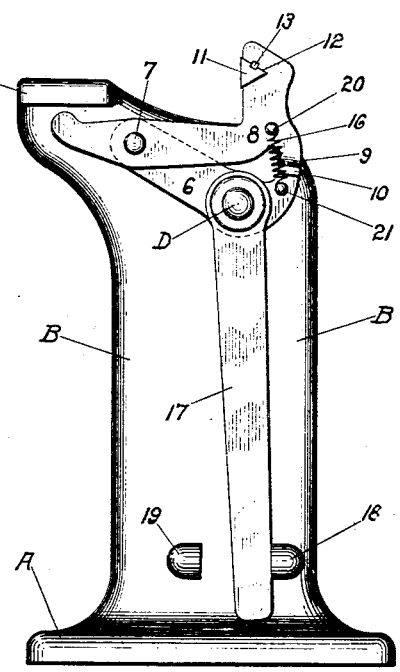
Figure 11:
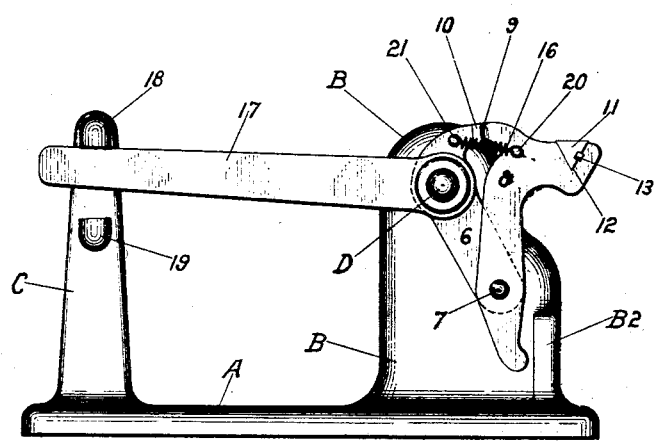
Figure 12:
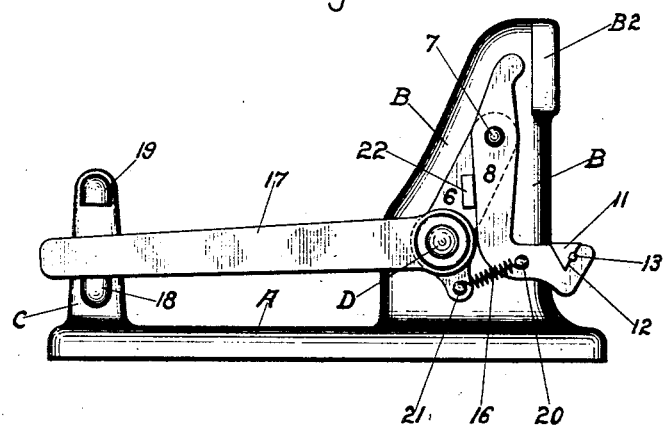

In the accompanying drawings, Figure 1 diagrammatically illustrates the path of the member from which motion is transmitted and also the path of the member to which motion is transmitted; Fig. 2 illustrates diagrammatically three positions of a member or a portion of a member to which motion is transmitted, two of these positions being at the ends of the L-shape path or range of movement, while the third position is at the angle of said path; Fig. 3 is a side elevation of an apparatus embodying my improvement, the motion receiving member being at the outer end of the horizontal portion of the path; Fig. 4 is a similar elevation, showing the receiving member at the angle of the path; Fig. 5 is a similar elevation, showing the receiving member at the upper end of its path; Fig. 6 is a plan of the same mechanism as shown in Fig. 3; Figs. 7 and 8 show the mechanism in other forms; Fig. 9 shows the mechanism of Fig. 5 set in another position. Fig. 10 shows the same mechanism in still another position; Fig. 11 is a detail view showing a modification; Fig. 12 is a detail elevation showing a modification of the mechanism in the right hand portion of Fig. 3.

Referring first to Figs. 1 to 6, inclusive, the nearly horizontal line, 1, illustrates the path of the motion transmitting member of the mechanism, and said path may be on a straight line, or on a curved line which is approximately straight. In the same figure, line, 2, represents the path of the motion receiving member of the mechanism, said path comprising two sections which are approximately straight and which meet each other at approximately a right angle. In Fig. 2, each triangle shows, diagrammatically, one position of the motion receiving member, the triangle marked, 3, showing said member at the right hand end of the path, 2, of Fig. 1; the triangle, 4, showing said member at the angle of said path; and the triangle, 5, showing said member at the upper end of said path.

A is a stationary base from which rise fixed standards, B, and C. In a bearing, B¹, in the standard, B, is a horizontal rock-shaft, D, supporting the rocking member, 6. But said shaft may be rigid and the rocking member made free to rotate thereon.

For convenience in description, the portion of the rocking member which is secured to the shaft, D, will be hereinafter termed the "inner end" of said rocking member, while the portion of said rocking member which is the farther from said shaft is termed the "outer end" of said rocking member.

A traveler, 8, is carried bodily by the rocking member, the traveler being hinged at, 7, to the outer end of the rocking member on an axis which is parallel to and at a fixed distance from the axis of the rocking member. Said hinge is between the ends of the traveler, 8, so that a portion of the body of said traveler extends outward beyond the outer end of the rocking member and another portion extends inward toward, and past, the axis of the rocking member, thus permitting that portion of the traveler to move toward and from the axis of the rocking member, or toward and from the rocking member, the rocking member and said inner portion of the traveler being adapted to approach and recede from each other, through a limited range, like the movement of the two blades of a pair of shears. Thus any point in said lower portion of the traveler, or any member carried by said lower portion, may move toward or from said axis in a curve which is concentric to the hinge axis on which the traveler and the rocking member are joined to each other. But my improved mechanism is so organized, that during a portion of the movement of the rocking member, the traveler is carried bodily by the rocking member without movement of the traveler upon its hinge, all portions of the traveler then having only one motion—in curves which are concentric to the axis of the rocking member (which is the axis of the shaft, D,) and that during a portion of the movement of the rocking member, the lower portion of the traveler moves through the combined path resulting from the bodily movement of the traveler in a curve having for its axis the axis of the rocking member, and at the same time turning upon its own axis—the hinge by which the traveler is joined to the rocking member. The movement of the inner end of the traveler toward the inner portion of the rocking member, by the turning of the traveler upon its hinge, is limited by the abutting of some portion of the traveler against some portion of the rocking member. In the form of mechanism illustrated by Figs. 3, 4 and 5, such an abutting occurs between the extension, 9, of the inner portion of the traveler and the extension, 10, of the rocking member. The inner portion of the traveler is extended away from the axis of the rocking member, and bears the part or portion, 11, which may be integral with the carrying member or may be detachable therefrom. Said portion, 11, is a convenient portion to use for the engagement of any part upon which the traveler, 8, is to act or work; and such portion may be regarded as the working portion of the traveler. In the drawings, this portion, 11, is shown as a separate piece, in the form of a three-sided prism resting in a V-shape notch, 12, in the traveler, and there secured by a slide key, 13, extending into a portion of the prism and into a portion of the traveler. For convenience in description, this portion of the traveler is herein termed the "motion receiving member", while the rocking member is termed the "motion transmitting member". The movement of the rocking member, 6, may be limited in any suitable manner, as, for example, by means of stops, 14, and, 15, on the standard, B, at the sides of the outer end of the rocking member. And within the limits thus fixed, said rocking member may move by the application of power thereto in any suitable manner, as, for example, through the shaft. D.

The outer end of the traveler extends far enough to the right (as shown in Figs. 3, 4 and 5), to make contact with the adjacent face of the abutment, $B^2$, during the latter portion of the rightward movement of the rocking member and the hinge, 7. After such contact, the place of such contact (which moves downward) serves as a shifting fulcrum, and the entire traveler, 8, is carried bodily downward and at the same time turned rightward upon such fulcrum. This results in a rightward movement of the motion receiving member in the portion of the path which is an approximately horizontal straight line, but which is, in fact, a curved line resulting from the simultaneous downward movement of the hinge, 7, in an oblique curve which is concentric to the shaft, D, and a rightward movement of the lower portion of the traveler by the turning of said member on the hinge, 7. This movement terminates when the rocking member abuts against the stop, 14. Such downward movement of the motion receiving member, 11, and the lower portion of the traveler, 8, is against the action of gravity, and against the action of a contracting spring 16, (if the latter is used). Gravity becomes a factor in this way, because the receiving member, 11, and the greater portion of the mass of the traveler, 8, are at the right hand side of the hinge, 7. The receiving member, 11, is now at the limit of its rightward movement, or at the right hand end of its path, and such position may be designated as the first or initial position of said member, this being the position represented by "3" in Fig. 2. When the rocking member is now moved leftward, said member carries the hinge, 7, upward and leftward, away from the abutment, $B^2$, so as to free the upper end of the traveler from engagement with said abutment, and allow said traveler to turn in response to gravity, the lower end of the traveler going leftward, and the upper end going rightward. The said turning movement of the traveler is arrested by the abutting of the extension, 9, of said member against the extension, 10, of the rocking member. This occurs before the rocking member reaches its leftward limit. And the instant said abutting occurs, the leftward movement of the receiving member, 11, ceases, and its upward movement begins (forming the angle in the path of the receiving member), the traveler now having only one movement, that being in unison with the rocking member, the motion receiving member going upward, because it is nearly in horizontal alinement with the axis of the rocking member. Said upward movement ceases when the rocking member makes contact with the stop, 15. Inasmuch as such movement of the motion receiving member is through a portion of the curve concentric to the rocking member axis and is short in proportion to the distance from said axis, it follows that such movement upward is, for most practical purposes, a straight upward movement. When the rocking member is again moving rightward, the receiving member, 11, moves downward in the same upright path in which it moved upward, until the upper end of the traveler, 8, again makes contact with the abutment, $B^2$. Thereafter, during the continuation of the rightward movement of the rocking member, the lower portion of the traveler again moves rightward, carrying the receiving member in that direction, in the former approximately horizontal path, until the initial or first position of said member is again reached. In this manner the rocking motion of the rocking member (which is the transmitting member) is converted into a back-and-forth motion of the receiving member through the L-shape path, the two sections of which path are approximately straight lines.

The rocking of the rocking member, 6, may be effected by the aid of a horizontal arm, 17, rigidly secured by one end to the rock-shaft, D, and having its other end extended between stops, 18 and 19, of the standard, C, such stops serving to limit the up-and-down movement of said arm. (Figs. 3, 4 and 5.) When such stops are used, the stops, 14 and 15, on the standard, B, may be omitted. It will be observed that, for the sake of accuracy, any stops used for limiting the movement of the rocking member should be as far from the axis of said member as is feasible.

In Fig. 7, the arm, 17, is upright on the shaft, D, and its movement is consequently from right to left and from left to right. And in Fig. 8, the arm, 17, is made a continuation of the upper end or portion of the rocking member, 6. In other words, the rocking member and said arm are made integral, and the latter leans rightward, the traveler, 8, being in this case between the standard, B, and the rocking member, in order that the arm, 17, may clear the abutment, $B^2$.

In Fig. 9, the entire mechanism of Fig. 5, is turned so as to bring the arm, 17, upward. In this position, the movement of the member, 11, is first upward and then rightward.

In Fig. 10, the entire mechanism of Fig. 5. is turned so as to make the arm, 17, extend downward, and the notch, 12, is transferred so as to direct the receiving member, 11, upward. In this form the path of the receiving member is first downward and then leftward. And in Fig. 11, the traveler, 8, and the rocking member, 6, of Fig. 5, are inverted, and the abutment, $B^2$, moved downward correspondingly, and the notch, 12, formed in what is the lower edge of the traveler, 8, in Fig. 5. In this form, the movement of the receiving member from its initial position, is first horizontal and then downward, instead of upward, as is the case in the form illustrated by Figs. 3, 4 and 5, it being assumed that in Fig. 11 the receiving member is at its limit of movement away from its initial position.

In any or all of the above mentioned forms of the mechanism, a spring, 16, may be combined with the traveler in such manner as to tend to move the traveler in opposition to the movement imparted by the action of the abutment, $B^2$. In the drawings, said spring is a contracting coiled spring having one end secured to a stud, 20, on the traveler and having its other end secured to a stud, 21, on the adjacent portion of the rocking member.

In Fig. 12, the extension, 9, of the traveler and the extension, 10, of the rocking member are omitted, and an abutment, 22, is placed on the side of the rocking member in proper position to arrest the leftward movement of the inner portion of the traveler at the desired inclination of the traveler, the engagement between said traveler and said abutment being substituted for the engagement between the extension, 9, of the traveler and the extension, 10, of the rocking member. The function is the same in the two forms; but greater accuracy may be attained by placing such engagement as far as may be from the hinge, 7. For this reason, the form shown in Fig. 3 is to be preferred to the form shown by Fig. 12.

I claim as my invention,—

1. In a mechanism for converting motion, the combination of relatively stationary supporting means, a rocking member having a relatively fixed axis, a traveler hinged to said rocking member by a hinge having an axis which is parallel to the rocking member axis and applied to the traveler between the ends of the latter, and means for compelling the traveler to turn on its hinge during a portion of the movement of the rocking member in one direction, the traveler being free during the other portion of such movement of the rocking member to be at rest relative to said traveler axis and move in unison with the latter, substantially as described.

2. In a mechanism for converting motion, the combination of relatively stationary supporting means, a rocking member having a relatively fixed axis, a traveler hinged to said rocking member by a hinge having an axis which is parallel to the rocking member axis and applied to the traveler between the ends of the latter, said rocking member and said traveler being each provided with abutting faces for limiting the movement of the inner end of the traveler, and means for compelling the traveler to turn on its hinge during a portion of the movement of the rocking member in one direction, the traveler being free during the other portion of such movement of the rocking member to be at rest relative to said traveler axis and move in unison with the latter, substantially as described.

3. In a mechanism for converting motion, the combination of relatively stationary supporting means, a rocking member having a relatively fixed axis, a traveler hinged to said rocking member by a hinge which is parallel to the rocking member axis and applied to the traveler between the ends of the latter, means for compelling the traveler to turn on its hinge during a portion of the movement of the rocking member in one direction, the traveler being free during the other portion of such movement of the rocking member to move in unison with the latter, and a spring arranged to move the inner end of the traveler in the opposite direction, substantially as described.

4. In a mechanism for converting motion, the combination of relatively stationary supporting means, a rocking member having a relatively fixed axis, a traveler hinged to said rocking member by a hinge which is parallel to the rocking member axis and applied to the traveler between the ends of the latter, said rocking member and said traveler being each provided with abutting faces for limiting the movement of the inner end of the traveler toward the rocking member axis, means for compelling the traveler to turn on its hinge during a portion of the movement of the rocking member in one direction, the traveler being free during the other portion of such movement of the rocking member to move in unison with the latter, and a spring arranged to move the inner end of the traveler in the opposite direction, substantially as described.

5. In a mechanism for converting motion, the combination of relatively stationary supporting means, a rocking member having a relatively fixed axis, a traveler hinged to said rocking member by a hinge having an axis which is parallel to the rocking member axis and applied to the traveler between the ends of the latter, and said traveler comprising a detachable working portion, and means for compelling the traveler to turn on its hinge during a portion of the movement of the rocking member in one direction, the traveler being free during the other portion of such movement of the rocking member to be at rest relative to said traveler axis and move in unison with the latter, substantially as described.

6. In a mechanism for converting motion, the combination of relatively stationary supporting means, a rocking member having a relatively fixed axis, a traveler hinged to said rocking member by a hinge having an axis which is parallel to the rocking member axis and applied to the traveler between the ends of the latter and such traveler comprising a detachable working portion, the movement of the inner end of the traveler relative to the rocking member being limited by abutting faces, and means for compelling the traveler to turn on its hinge during a portion of the movement of the rocking member in one direction, the traveler being free during the other portion of such movement of the rocking member to be at rest relative to said traveler axis and move in unison with the latter, substantially as described.

7. In a mechanism for converting motion, the combination of relatively stationary supporting means, a rocking member having a relatively fixed axis, a traveler hinged to said rocking member by a hinge having an axis which is parallel to the rocking member axis and applied to the traveler between the ends of the latter and said member comprising a detachable working portion, and means for compelling the traveler to turn on its hinge during a portion of the movement of the rocking member in one direction, the traveler being free during the other portion of such movement of the rocking member to be at rest relative to said traveler axis and move in unison with the latter, substantially as described.

8. In a mechanism for converting motion, the combination of relatively stationary supporting means, a rocking member having a relatively fixed axis, a traveler hinged to said rocking member by a hinge which is parallel to the rocking member axis and applied to the traveler between the ends of the latter, the said traveler comprising a detachable portion, the movement of the inner end of the traveler relative to the rocking member being limited by abutting faces, means for compelling the traveler to turn on its hinge during a portion of the movement of the rocking member in one direction, the traveler being free during the other portion of such movement of the rocking member to move in unison with the latter, and a spring arranged to move the inner end of the traveler in the opposite direction, substantially as described.

In testimony whereof I have signed my name, in presence of two witnesses, this 28th day of June, in the year one thousand nine hundred and eleven.

CHARLES WALES.

Witnesses:
JOHN H. DE WITT,
W. E. BOLLING.